United States Patent
Jellema

(10) Patent No.: US 11,930,364 B2
(45) Date of Patent: Mar. 12, 2024

(54) NETWORK ASSISTED DATA LOCATION ASSURANCE

(71) Applicant: Telefonaktiebolaget LM Ericsson (publ), Stockholm (SE)

(72) Inventor: Bate Jellema, Green Valley (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 316 days.

(21) Appl. No.: 16/966,245

(22) PCT Filed: Feb. 5, 2018

(86) PCT No.: PCT/IB2018/050715
§ 371 (c)(1),
(2) Date: Jul. 30, 2020

(87) PCT Pub. No.: WO2019/150177
PCT Pub. Date: Aug. 8, 2019

(65) Prior Publication Data
US 2021/0051480 A1    Feb. 18, 2021

(51) Int. Cl.
*H04W 12/104*    (2021.01)
*H04W 12/63*    (2021.01)
(Continued)

(52) U.S. Cl.
CPC ......... *H04W 12/104* (2021.01); *H04W 12/63* (2021.01); *H04W 12/72* (2021.01); *H04W 88/16* (2013.01)

(58) Field of Classification Search
CPC ... H04W 12/104; H04W 12/63; H04W 12/64; H04W 12/72; H04W 88/16; H04L 67/56; H04L 67/1097
See application file for complete search history.

(56) References Cited

U.S. PATENT DOCUMENTS

| | | | |
|---|---|---|---|
| 2006/0059367 A1* | 3/2006 | Yarvis | G07C 9/28 |
| | | | 713/168 |
| 2007/0178882 A1* | 8/2007 | Teunissen | H04L 63/18 |
| | | | 455/411 |

(Continued)

OTHER PUBLICATIONS

Jia, Dongzheng; Liu, Limin; Jia, Shijie; Lin, Jingqiang; "VoteGeo: An IoT-based Voting Approach to Verify the Geographic Location of Cloud Hosts," 2019 IEEE 38th International Performance Computing and Communications Conference (IPCCC), London, UK, 2019, pp. 1-9, doi: 10.1109/IPCCC47392.2019.8958736.*

(Continued)

*Primary Examiner* — Victor Lesniewski
(74) *Attorney, Agent, or Firm* — Christopher & Weisberg P.A.

(57) ABSTRACT

A method, apparatus, and system are provided for verifying a location of data stored on at least one storage device within at least one cell area served by at least one network node of a wireless communication network. In one embodiment, a location assurance gateway is provided with a communication interface and processing circuitry, the processing circuitry configured to cause the communication interface to communicate with the at least one network node of the wireless communication network for location information associated with the at least one cell area, the location information associated with the at least one cell area being used to verify a location of the data stored on the at least one storage device.

12 Claims, 9 Drawing Sheets

(51) Int. Cl.
*H04W 12/72* (2021.01)
*H04W 88/16* (2009.01)

(56) References Cited

U.S. PATENT DOCUMENTS

| | | | | |
|---|---|---|---|---|
| 2007/0202886 | A1* | 8/2007 | Dhebri | H04W 4/029 |
| | | | | 455/456.1 |
| 2014/0173089 | A1* | 6/2014 | Li | H04L 67/52 |
| | | | | 709/224 |
| 2016/0065589 | A1* | 3/2016 | Leighton | H04L 63/123 |
| | | | | 726/4 |
| 2016/0182110 | A1* | 6/2016 | Selvaraj | H04W 8/245 |
| | | | | 455/558 |
| 2016/0269923 | A1* | 9/2016 | Celik | H04W 4/06 |
| 2016/0379282 | A1* | 12/2016 | Hill | G06Q 50/01 |
| | | | | 705/26.1 |
| 2017/0064399 | A1* | 3/2017 | Jabara | H04L 51/224 |
| 2017/0141921 | A1* | 5/2017 | Berger | H04L 63/123 |

OTHER PUBLICATIONS

International Search Report and Written Opinion dated Feb. 11, 2018 for International Application No. PCT/B2018/050715 filed on Feb. 5, 2018, consisting of 12-pages.

Gaven J. Watson; LoSt: Location Based Storage; Oct. 19, 2012,; pp. 1-57; XP002785751; consisting of 11-pages.

Michael Bartock et al.; Trusted Geolocation in the Cloud: Proof of Concept Implementation; NISTIR 7904; Dec. 2015, pp. 1-59, National Institute of Standards and Technology, Gaithersburg, MD; consisting of 59-pages.

Aiiad Albeshri et al., GeoProof: Proofs of Geographic Location for Cloud Computing Environment, 32nd International Conference on Distributed Computing Systems Workshops, 2012, pp. 506-514, Information Secutiry Institute, Brisbane, AU; consisting of 9-pages.

* cited by examiner

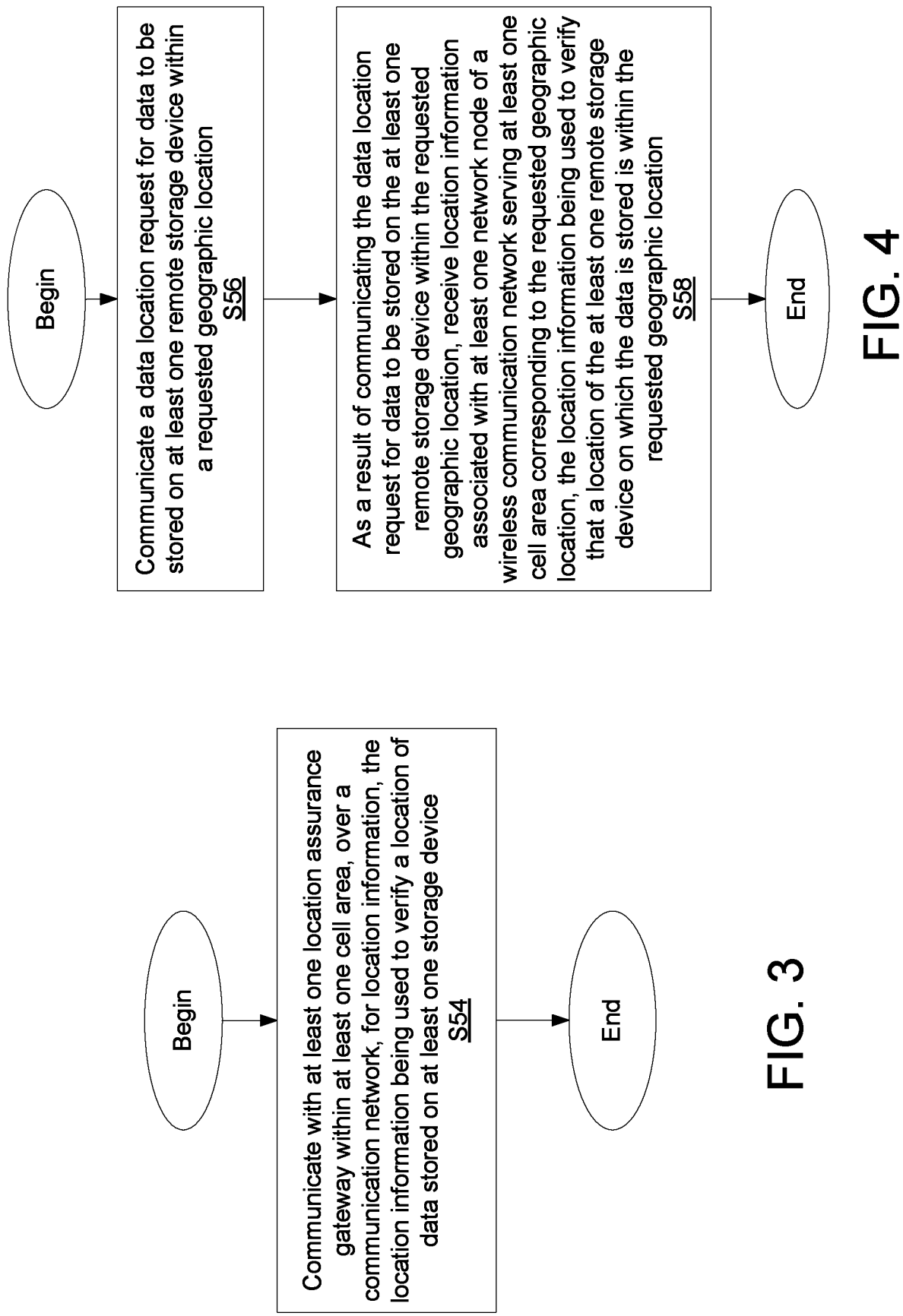

NETWORK ASSISTED DATA LOCATION ASSURANCE

CROSS-REFERENCE TO RELATED APPLICATION

This application is a Submission Under 35 U.S.C. § 371 for U.S. National Stage Patent Application of International Application Number: PCT/M2018/050715, filed Feb. 5, 2018 entitled "NETWORK ASSISTED DATA LOCATION ASSURANCE," the entirety of which is incorporated herein by reference.

TECHNICAL FIELD

The present disclosure relates to data location assurance and, in particular, to methods, apparatuses, and systems for network assisted data location assurance.

BACKGROUND

For enterprises, organizations and other users making use of (public) cloud storage services, it may be important to these users to know where the cloud service provider's infrastructure is physically located and where exactly their data will be stored. The data submitted to the cloud storage service by such users will ultimately be located on some physical media that resides in a certain country, or area of jurisdiction with its own laws and regulations. The location of the stored data will render such stored data subject to the locally applicable laws, regulations, and other rules, which may have significant business impacts. Increasingly, countries and other areas of jurisdiction are enacting legislation with rules as to where, geographically, certain types of user data may be stored, with significant penalties in cases of non-compliance.

Users of a cloud storage service can often indicate a location preference as part of the Service Level Agreement (SLA) with the service provider, after which it becomes a matter of trust between the user and the service provider that these location preferences/requirements are actually respected. This trust relationship can be further strengthened if the service provider can obtain relevant certification from an independent authority.

Some known technical mechanisms for proving or estimating a data center's location exist, such as, for example, Internet Protocol (IP) address mapping, measuring network delays between client and server or between known servers ("landmarks") and the storage server, or by geo-tagging the physical servers during provisioning.

However, cloud service providers generally do not inform their users of the exact location of where their services and data reside. Further, even if cloud service providers do show location information on their service portals, such information can only be taken at face value. There is no forensic proof of data location that can be made available to the enterprise should such enterprise be challenged by its customers, or by local authorities.

Known technical solutions, such as IP address mapping and latency measurements are very unreliable and can be easily circumvented. Geotagging of hardware and other administrative procedures generally rely on the integrity of the data center's information technology (IT) staff; yet, statistics show that the majority of IT security incidents are in fact related to inside jobs.

In addition, enterprises and other organizations storing, for example, business critical or sensitive data in a cloud storage solution may require assurances that the sensitive data is being kept safe and secure. This is typically achieved by the addition of digital signatures to the data, such as, for example, through a Keyless Signatures Infrastructure (KSI), where the use of irreversible hashing mechanisms can mathematically prove that the data content has not been altered since it was signed.

Although digital signatures can be very helpful in verifying data integrity, digital signatures do not hold any clue as to the data's physical location. For enterprises and other organizations making use of cloud storage services, as discussed above, it is increasingly important to know where the cloud service provider's infrastructure is physically located and where exactly the data is being stored.

If a cloud service provider provides users with a choice of locations for the users' data and/or workloads, the adherence to such location preferences are typically based on trust and administrative procedures. Unfortunately, adherence to such location preferences is typically not guaranteed, nor verifiable by the user or consumer.

SUMMARY

Some embodiments of the present disclosure advantageously provide methods, apparatuses and systems that can leverage the presence of cellular networks covering the cloud service provider's data center sites, to anchor the data center and the data residing in it to a specific location area (e.g., cell identifier) within the cellular network.

Some other embodiments advantageously provide methods, apparatuses and systems that utilize the presence of cellular networks covering the cloud service provider's data center sites, where the cellular network may track/locate a data center and data residing in it by observing from which specific location area (e.g., cell identifier) that data center connects to the cellular network.

According to one aspect of the disclosure, a location assurance gateway for verifying a location of data stored on at least one storage device within at least one cell area served by at least one network node of a wireless communication network is provided. The location assurance gateway includes a communication interface and processing circuitry, the processing circuitry configured to cause the communication interface to communicate with the at least one network node of the wireless communication network for location information associated with the at least one cell area, the location information associated with the at least one cell area being used to verify a location of the data stored on the at least one storage device.

According to this aspect of the disclosure, in some embodiments, the verification of the location of the data stored on the at least one storage device includes using the communication of the gateway with the at least one network node of the wireless communication network to determine whether a physical location of the stored data is within a user-requested geographic area. In some embodiments, the verification of the location of the data stored on the at least one storage device includes using the communication of the gateway with the at least one network node of the wireless communication network to determine whether a physical location of the stored data is within a user-requested geographic area by comparing a geographic area associated with the at least one cell area to the user-requested geographic area. In some embodiments, the gateway further includes a server interface, the processing circuitry configured to cause the server interface to communicate with at least one storage server associated with the at least one storage device on which the data is stored for data possession verification, the data possession verification including determining whether the data stored on the at least one storage device is the same as the data whose location is being verified. In some embodiments, the communication of the communication interface with the at least one network node of the wireless communication network includes receiving, from the at least one network node, at least one code, each of the at least one code being configured to be unique to the one cell area as compared to other cell areas of the wireless communication network. In some embodiments, the at least one code is a sequence of codes, each of the sequence of codes being configured to be unique to the one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each of the at least one code is broadcast by the at least one network node as a short message service—cell broadcast (SMS-CB) message within the at least one cell area at a predetermined periodic interval. In some embodiments, the gateway includes a Subscriber Identity Module (SIM) associated with a mobile subscriber identifier, and the communication of the communication interface with the at least one network node of the wireless communication network includes transmitting, to the at least one network node, at least one indication of a location of the gateway, the location of the gateway associated with the mobile subscriber identifier. In some embodiments, the gateway is further configured to communicate with a digital signature service provider using the mobile subscriber identifier as at least a portion of a digital signature for the stored data.

According to another aspect of the present disclosure, a method for a location assurance gateway for verifying a location of data stored on at least one storage device within at least one cell area served by at least one network node of a wireless communication network is provided. The method includes communicating with the at least one network node of the wireless communication network for location information associated with the at least one cell area, the location information being used to verify a location of the data stored on the at least one storage device.

According to this aspect, in some embodiments, the verification of the location of the data stored on the at least one storage device includes using the communication of the gateway with the at least one network node of the wireless communication network to determine whether a physical location of the stored data is within a user-requested geographic area. In some embodiments, the verification of the location of the data stored on the at least one storage device includes using the communication of the gateway with the at least one network node of the wireless communication network to determine whether a physical location of the stored data is within a user-requested geographic area by comparing a geographic area associated with the at least one cell area to the user-requested geographic area. In some embodiments, the method further includes communicating with at least one storage server associated with the at least one storage device on which the data is stored for data possession verification, the data possession verification including determining whether the data stored on the at least one storage device is the same as the data whose location is being verified. In some embodiments, the method further includes receiving, from the at least one network node of the wireless communication network, at least one code, each of the at least one code being configured to be unique to the one cell area as compared to other cell areas of the wireless communication network. In some embodiments, the at least one code is a sequence of codes, each of the sequence of codes being configured to be unique to the one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, receiving the at least one code includes receiving each code of the at least one code from the at least one network node as a short message service—cell broadcast (SMS-CB) message within the at least one cell area at a predetermined periodic interval. In some embodiments, the method further includes transmitting, to the at least one network node, at least one indication of a location of the gateway, the location of the gateway being associated with a mobile subscriber identifier of a Subscriber Identity Module (SIM) associated with the gateway. In some embodiments, the method further includes communicating with a digital signature service provider using the mobile subscriber identifier as at least a portion of a digital signature for the data.

According to yet another aspect, in some embodiments, a network node for a wireless communication network is provided, the network node configured to provide location assurance services for verifying a location of data stored on at least one storage device within at least one cell area served by the network node. The network node includes a communication interface, and processing circuitry, the processing circuitry configured to cause the communication interface to communicate with at least one location assurance gateway within the at least one cell area for location information, the location information being used to verify a location of the data stored on the at least one storage device.

According to this aspect, in some embodiments, the communication of the network node with the at least one location assurance gateway includes transmitting, to the at least one location assurance gateway, at least one code, the at least one code being the location information used to verify the location of the data and each of the at least one code being configured to be unique to the at least one cell area as compared to other cell areas of the wireless communication network. In some embodiments, the at least one code is a sequence of codes, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each of the at least one code is transmitted to the at least one location assurance gateway as a short message service—cell broadcast (SMS-CB) message within the at least one cell area being served by the network node. In some embodiments, the processing circuitry is configured to: receive a user-requested location verification request of the data stored on the at least one storage device, the user-requested location verification request including at least one code; compare the at least one code from the user-requested location verification request to at least one code stored in a database associated with the network node; and in response to the user-requested location verification, communicate at least one indication of a location of the at least one location assurance gateway corresponding to the at least one code from the user-requested location verification request. In some embodiments, the communication of the network node with the at least one location assurance gateway includes receiving, from the at least one location assurance gateway, at least one indication of a location of the location assurance gateway associated with a mobile subscriber identifier. In some embodiments, the processing circuitry is further configured to receive a data possession verification request, the data possession verification request associated with a mobile subscriber identifier, the mobile subscriber identifier used to determine whether the at least one storage device associated with at least one location assurance gateway having the mobile subscriber identifier possesses the data whose location is being verified. In some embodiments, the processing circuitry is further configured to: receive a user-requested location verification request of the data stored on the at least one storage device, the user-requested location verification request including a mobile subscriber identifier; and in response to the user-requested location verification, communicate at least one indication of a location associated with the mobile subscriber identifier.

According to another aspect, a method for a network node of a wireless communication network configured to provide location assurance services for verifying a location of data stored on at least one storage device within at least one cell area served by the network node is provided. The method includes communicating with at least one location assurance gateway within the at least one cell area, over the wireless communication network, for location information, the location information being used to verify a location of the data stored on the at least one storage device.

According to this aspect, in some embodiments, communicating with at least one location assurance gateway includes transmitting, to the at least one location assurance gateway, at least one code, the at least one code being the location information used to verify the location of the data and each of the at least one code being configured to be unique to the at least one cell area as compared to other cell areas of the wireless communication network. In some embodiments, the at least one code is a sequence of codes, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each code of the at least one code is transmitted to the at least one location assurance gateway as a short message service—cell broadcast (SMS-CB) message within the at least one cell area being served by the network node. In some embodiments, the method further includes receiving a user-requested location verification request of the data stored on the at least one storage device, the user-requested location verification request including at least one code; comparing the at least one code from the user-requested location verification request to at least one code stored in a database associated with the network node; and in response to the user-requested location verification, communicating at least one indication of a location of the at least one location assurance gateway corresponding to the at least one code from the user-requested location verification request. In some embodiments, communicating with at least one location assurance gateway includes receiving, from the at least one location assurance gateway, at least one indication of a location of the location assurance gateway associated with a mobile subscriber identifier. In some embodiments, the method further includes receiving a data possession verification request, the data possession verification request associated with a mobile subscriber identifier, the mobile subscriber identifier used to determine whether the at least one storage device associated with at least one location assurance gateway having the mobile subscriber identifier possesses the data whose location is being verified. In some embodiments, the method further includes receiving a user-requested location verification request of the data stored on the at least one storage device, the user-requested location verification request including a mobile subscriber identifier; and in response to the user-requested location verification, communicating at least one indication of a location associated with the mobile subscriber identifier.

According to yet another aspect, in some embodiments, a user equipment (UE) is provided. The UE includes processing circuitry, the processing circuitry configured to: communicate a data location request for data to be stored on at least one remote storage device within a requested geographic location; and, as a result of the data location request for the data to be stored on the at least one remote storage device within the requested geographic location, receive location information associated with at least one network node of a wireless communication network serving at least one cell area corresponding to the requested geographic location, the location information being used to verify that a location of the at least one remote storage device on which the data is stored is within the requested geographic location.

According to this aspect, in some embodiments, the processing circuitry is configured to execute instructions to communicate with the at least one network node of the wireless communication network serving the at least one cell area corresponding to the requested geographic location to verify that the at least one remote storage device being served by the at least one network node possesses the data whose location is being verified. In some embodiments, the processing circuitry is configured to communicate the data to be stored on the at least one remote storage device to at least one cloud storage server for storage of the data on the at least one remote storage device, the at least one cloud storage server in communication with the at least one network node of the wireless communication network via a location assurance gateway. In some embodiments, the received location information includes an indication of at least one code, each of the at least one code being configured to be unique to the at least one cell area as compared to other cell areas of the wireless communication network. In some embodiments, the at least one code is a sequence of codes, the sequence of codes being broadcast by the at least one network node of the wireless communication network serving the at least one cell area, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, the received location information includes a mobile subscriber identifier of a location assurance gateway, the location assurance gateway being in communication with the at least one storage device and the at least one network node for verifying a location of the at least one storage device using the mobile subscriber identifier.

According to yet another aspect, a method for location verification of data stored on at least one remote storage device is provided. The method includes: communicating a data location request for data to be stored on at least one remote storage device within a requested geographic location; and, as a result of communicating the data location request for the data to be stored on the at least one remote storage device within the requested geographic location, receiving location information associated with at least one network node of a wireless communication network serving at least one cell area corresponding to the requested geographic location, the location information being used to verify that a location of the at least one remote storage device on which the data is stored is within the requested geographic location.

According to this aspect, in some embodiments, the method further includes communicating with the at least one network node of the wireless communication network serving the at least one cell area corresponding to the requested geographic location to verify that the at least one remote storage device being served by the at least one network node possesses the data whose location is being verified. In some embodiments, the method further includes communicating the data to be stored on the at least one remote storage device to at least one cloud storage server for storage of the data on the at least one remote storage device, the at least one cloud storage server in communication with the at least one network node of the wireless communication network via a location assurance gateway. In some embodiments, receiving the location information includes receiving an indication of at least one code, the at least one code being broadcast by the at least one network node of the wireless communication network serving the at least one cell area, each of the at least one code being configured to be unique to the at least one cell area as compared to other cell areas of the wireless communication network. In some embodiments, the at least one code is a sequence of codes, the sequence of codes being broadcast by the at least one network node of the wireless communication network serving the at least one cell area, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, receiving the location information includes receiving a mobile subscriber identifier of a location assurance gateway, the location assurance gateway being in communication with the at least one storage device and the at least one network node for verifying a location of the at least one storage device using the mobile subscriber identifier.

According to another aspect, a system for location verification of data stored on at least one storage device is provided. The system includes at least one network node of a wireless communication network, the at least one network node serving at least one cell area; and a location assurance gateway in communication with at least one storage device and the at least one network node. The location assurance gateway is configured to communicate with the at least one network node for location information associated with the at least one cell area within which the at least one storage device is located for verifying a location of data stored on the at least one storage device.

According to this aspect, in some embodiments, the system further includes at least one user equipment (UE). The UE is configured to: communicate a data location request for the data to be stored on the at least one storage device within a requested geographic location; and, as a result of the data location request for the data to be stored on the at least one storage device within the requested geographic location, receive the location information associated with the at least one cell area within which the at least one storage device is located, the at least one cell area corresponding to the requested geographic location, and the location information being used to verify that the location of the at least one storage device on which the data is stored is within the requested geographic location. In some embodiments, the location information includes an indication of a sequence of codes, the sequence of codes being broadcast by the at least one network node of the wireless communication network serving the at least one cell area, each of the sequence of codes being configured to be unique to the at least one cell area as compared to other cell areas of the wireless communication network. In some embodiments, each of the sequence of codes is further configured to be unique to a time period, as compared to other time periods associated with a predetermined periodic interval at which each of the sequence of codes is communicated. In some embodiments, the location information includes a mobile subscriber identifier of the location assurance gateway, the mobile subscriber identifier of the location assurance gateway being used to verify the location of data stored on the at least one storage device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart of an exemplary method for a network node according to one embodiment of the present disclosure;

FIG. 4 is a flowchart of an exemplary method for a UE according to one embodiment of the present disclosure;

DETAILED DESCRIPTION

Figure 1:
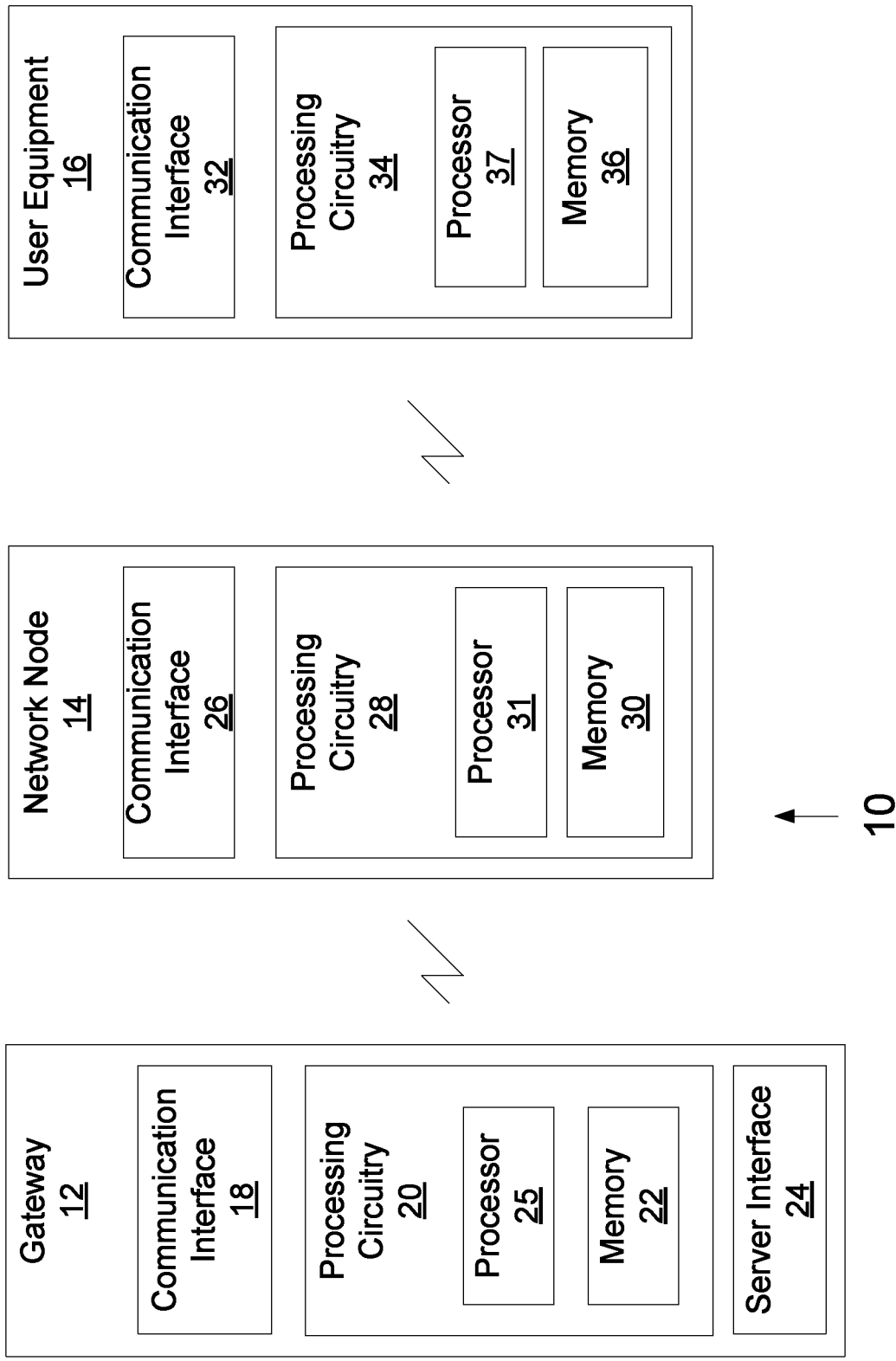
FIG. 1 is a block diagram of a location assurance system including a location assurance gateway, a network node, and a user equipment (UE), according to one embodiment of the present disclosure.

Before describing in detail exemplary embodiments, it is noted that the embodiments reside primarily in combinations of apparatus components and processing steps related to network assisted data location assurance. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. The UE herein can by any type of communication device capable of communicating with a cloud service provider and/or a network node and/or a server, such as, for example, personal computer (PC), a Tablet, a mobile terminal, via a wired connection and/or a wireless connection. The UE can, in some embodiments, be considered a client terminal, usable by a user (e.g., an enterprise administrator), to communicate with one or more server elements (e.g., location assurance server, storage server, service portal, etc.) to verify data location and/or data possession and/or data integrity/security according to one or more of the techniques described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. The arrangements discussed herein may also be applied to 5G/New Radio (NR), and other technologies. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, the term "gateway" and "location assurance gateway" and "KSI gateway" are used interchangeably. The gateway herein can, in some embodiments, be considered a gateway that connects at least one network and/or system (e.g., a wireless network) to another, different, at least one network and/or system (e.g., data center server) and may translate, manage and/or assist the different networks and/or systems with communicating with one another to provide certain services, such as, for example, data location assurance services, as described in some embodiments of the present disclosure.

As used herein, the term "code" is intended to indicate any sequence of symbols that can be communicated in a mobile network and that is used to uniquely indicate one or more cell areas as compared to other cell areas within the mobile network through such communication. As used herein, the term "code" is intended broadly to encompass, without limitation, words, numbers, characters, character string, symbols, etc. in any language.

Note further, that functions described herein as being performed by a UE or a network node or a gateway may be distributed over a plurality of UEs and/or network nodes and/or gateway. In other words, it is contemplated that the functions of the network node and UE and gateway described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, the methods, apparatuses, and systems described in the present disclosure may advantageously provide for a location assurance server within or otherwise connected to the mobile wireless network to generate different secret codes (e.g., alphanumeric codes, code words, keys, etc.) for each cell in the wireless network, to be broadcast at regular intervals. In some embodiments, at least one location assurance gateway in each data center may capture these code words as received locally through a communication interface at the gateway and to associate them with the stored data files at the data center. In some embodiments, users will be able to undeniably (or at least with a high degree of certainty as compared to known techniques) prove that the medium on which their data is stored was within range of a specific cell tower at the time of each broadcast, which will tie the stored data to a narrow geographic location. Thus, enterprises using cloud storage services may be able to forensically prove that they are treating customer data responsibly and within the law. Advantageously, embodiments of the present disclosure can increase consumer confidence, avoid financial and/or public relations damage, and/or provide users with tangible evidence to take action with their cloud service provider should any SLA violations, with respect to data location, be detected.

Some embodiments advantageously use the vicinity of any cloud data center to one or more cell towers to pin the data center site to the cellular grid.

Some embodiments advantageously use a record maintained by the cellular service provider of locally broadcasted unique secret codes per location per point in time as proof of location for a data center, together with proof of possession of a given data file, in order to establish a tamper proof digital trace of data location.

Some embodiments of the present disclosure may use a cellular service provider as a trusted and independent provider of verified location information with regards to cloud infrastructure.

Some embodiments provide for the cellular network to implement a service where cellular devices can be tracked. In some embodiments, a KSI gateway may be attached to a data center for protecting and signing the data and the KSI gateway may further include a radio module or communication interface capable of connecting to the cellular network providing such mobile positioning service. Such embodiments may allow enterprises using cloud storage services to forensically prove that they are treating customer data responsibly and within the law. Some such embodiments may advantageously increase consumer confidence, defuse legal challenges, avoid financial and/or public relations damage, and also provide tangible evidence to take action with their cloud service provider if an SLA violation occurs with respect to data location.

Some embodiments may use a tamper proof unit or enclosure that is to be installed at the data center and that can interact both with a global signing service for proving data possession and integrity as well as with a cellular service for proving data location. Such tamper proof enclosure may enclose and thereby secure embodiments of a location assurance gateway and/or a digital signature service gateway (e.g., KSI gateway).

Referring now to the drawings, in which like reference designators refer to like elements, there is shown in FIG. 1, an exemplary location assurance system, and its related components, constructed in accordance with the principles of the present disclosure and designated generally as "10." Referring to FIG. 1, system 10 may include a gateway 12, a network node 14, and a UE 16 in communication with one another, via one or more communication links, paths, connections, and/or networks using one or more communication protocols, where the gateway 12, network node 14, and UE 16 may be configured to perform one or more of the processes and/or techniques described herein. Although the system 10 depicted in FIG. 1 includes a single gateway 12, a single network node 14, and a single UE 16, it is contemplated that the system 10 may include any number of gateways 12, network nodes 14, and/or UEs 16. Furthermore, although the connections in the system 100 are illustrated in FIG. 1 as between the gateway 12 and the network node 14 and between the UE 16 and the network node 14, it should be understood that each of the gateway 12, network node 14, and UE 16 may be connected with one another via more than one connection and/or over more than one network. For example, the network node 14 may be connected to the gateway 12 via a wireless radio connection for the wireless communication of location information, but may, in some embodiments, also be connected to the UE 16 via using a wireless connection and/or a wired connection via the Internet, for example. As yet another example, in some embodiments, the UE 16 may be connected to the gateway 12 over a network outside of the wireless network, such as, for example, the Internet. It should be understood that the connections between each of the gateway 12, network node 14, and/or UE 16 may be many and varied in different embodiments.

In one embodiment, the gateway 12 includes a communication interface 18, processing circuitry 20, memory 22, and a server interface 24. The communication interface 18 may be configured to communicate with the network node 14 and/or other elements in the system 10. In some embodiments, the communication interface 18 may be formed as or may include, for example, one or more radio frequency (RF) transmitters, one or more RF receivers, and/or one or more RF transceivers, and/or may be considered a radio interface. In some embodiments, the communication interface 18 may include a wired and/or a wireless interface. In one embodiment, the communication interface 18 may include or be associated with a network interface element, such as, for example, a SIM card that may have a unique mobile subscriber identifier.

The server interface 24 may be configured to communicate with a storage server at a data center and/or other elements in the system 10. In some embodiments, the server interface 24 can be any interface that connects the gateway 12 to at least one storage device and/or at least one storage server to verify possession of data stored on the at least one storage device and/or to verify data location of the data stored thereon. The server interface 24 can be formed as or may include, for example, a high-speed serial or parallel interface, a bus, an optical connection, a wired connection, an Ethernet connection, etc.

The processing circuitry 20 may include one or more processors 25 and memory, such as, the memory 22. In particular, in addition to a traditional processor and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 25 and/or the processing circuitry 20 may be configured to access (e.g., write to and/or read from) the memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the gateway 12 may further include software stored internally in, for example, memory 22, or stored in external memory (e.g., database) accessible by the gateway 12 via an external connection. The software may be executable by the processing circuitry 20. The processing circuitry 20 may be configured to control any of the methods and/or processes described herein and/or to cause such methods, and/or processes to be performed, e.g., by the gateway 12. The memory 22 is configured to store data, programmatic software code and/or other information described herein. In some embodiments, the software may include instructions that, when executed by the processor 25 and/or processing circuitry 20, causes the processor 25 and/or processing circuitry 20 to perform the processes described herein with respect to the gateway 12.

For example, the processing circuitry 20 of the gateway 12 may be configured for verifying a location of data stored on at least one storage device within at least one cell area served by at least one network node of a wireless communication network. The processing circuitry 20 may be configured to cause the communication interface 18 to communicate with the at least one network node 14 of the wireless communication network for location information associated with the at least one cell area. The location information associated with the at least one cell area may be used to verify a location of the data stored on the at least one storage device. In some embodiments, the verification of the location of the data stored on the at least one storage device includes using the communication of the gateway with the at least one network node 14 of the wireless communication network to determine whether a physical location of the stored data is within a user-requested geographic area. In some embodiments, the verification of the location of the data stored on the at least one storage device includes using the communication of the gateway with the at least one network node of the wireless communication network to determine whether a physical location of the stored data is within a user-requested geographic area by comparing a geographic area associated with the at least one cell area to the user-requested geographic area. In some embodiments, the processing circuitry 20 may be configured to cause the server interface 24 to communicate with at least one storage server associated with the at least one storage device on which the data is stored for data possession verification, the data possession verification including determining whether the data stored on the at least one storage device is the same as the data whose location is being verified. In some embodiments, the communication of the communication interface 18 with the at least one network node 14 of the wireless communication network includes receiving, from the at least one network node 14, at least one code, each of the at least one code being configured to be unique to the one cell area as compared to other cell areas of the wireless communication network. In some embodiments, the at least one code is a sequence of codes, each of the sequence of codes being configured to be unique to the one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each of the at least one code is broadcast by the at least one network node as a short message service—cell broadcast (SMS-CB) message within the at least one cell area at a predetermined periodic interval. In some embodiments, the gateway 12 includes a Subscriber Identity Module (SIM) associated with a mobile subscriber identifier (e.g., international mobile subscriber identity (IMSI)). In some embodiments, the communication of the communication interface 18 with the at least one network node 14 of the wireless communication network includes transmitting, to the at least one network node 14, at least one indication of a location of the gateway 12, the location of the gateway 12 being associated with the mobile subscriber identifier. In some embodiments, the gateway 12 is further configured to communicate with a digital signature service provider using the mobile subscriber identifier as at least a portion of a digital signature for the stored data.

In one embodiment, the network node 14 includes a communication interface 26, processing circuitry 28, and memory 30. The communication interface 26 may be configured to communicate with the gateway 12 and/or other elements in the system 10. In some embodiments, the communication interface 26 may be formed as or may include, for example, one or more radio frequency (RF) transmitters, one or more RF receivers, and/or one or more RF transceivers, and/or may be considered a radio interface. In some embodiments, the communication interface 26 may include a wired and/or a wireless interface.

The processing circuitry 28 may include one or more processors 31 and memory, such as, the memory 30. In particular, in addition to a traditional processor and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 31 and/or the processing circuitry 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 14 may further include software stored internally in, for example, memory 30, or stored in external memory (e.g., database) accessible by the network node 14 via an external connection. The software may be executable by the processing circuitry 28. The processing circuitry 28 may be configured to control any of the methods and/or processes described herein and/or to cause such methods, and/or processes to be performed, e.g., by the network node 14. The memory 30 is configured to store data, programmatic software code and/or other information described herein. In some embodiments, the software may include instructions that, when executed by the processor 31 and/or processing circuitry 28, causes the processor 31 and/or processing circuitry 28 to perform the processes described herein with respect to the network node 14.

For example, the processing circuitry 28 of the network node 14 may be configured to provide location assurance services for verifying a location of data stored on at least one storage device within at least one cell area served by the network node 14. The processing circuitry 28 may be configured to cause the communication interface 26 to communicate with at least one location assurance gateway 12 within the at least one cell area for location information. The location information may be used to verify a location of the data stored on the at least one storage device. In some embodiments, the communication of the network node 14 with the at least one location assurance gateway 12 includes transmitting, to the at least one location assurance gateway, at least one code, the at least one code being the location information used to verify the location of the data and each of the at least one code being configured to be unique to the at least one cell area as compared to other cell areas of the wireless communication network. In some embodiments, the at least one code is a sequence of codes, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each of the at least one code is transmitted to the at least one location assurance gateway 12 as a short message service—cell broadcast (SMS-CB) message within the at least one cell area being served by the network node 14. In some embodiments, the processing circuitry 28 is configured to: receive a user-requested location verification request of the data stored on the at least one storage device, the user-requested location verification request including at least one code; compare the at least one code from the user-requested location verification request to at least one code stored in a database associated with the network node 14; and in response to the user-requested location verification, communicate at least one indication of a location of the at least one location assurance gateway 12 corresponding to the at least one code from the user-requested location verification request. In some embodiments, the communication of the network node 14 with the at least one location assurance gateway 12 includes receiving, from the at least one location assurance gateway 12, at least one indication of a location of the location assurance gateway 12 associated with a mobile subscriber identifier. In some embodiments, the processing circuitry 28 is further configured to receive a data possession verification request, the data possession verification request associated with a mobile subscriber identifier, the mobile subscriber identifier used to determine whether the at least one storage device associated with at least one location assurance gateway 12 having the mobile subscriber identifier possesses the data whose location is being verified. In some embodiments, the processing circuitry 28 is further configured to: receive a user-requested location verification request of the data stored on the at least one storage device, the user-requested location verification request including a mobile subscriber identifier; and in response to the user-requested location verification, communicate at least one indication of a location associated with the mobile subscriber identifier.

In one embodiment, the UE 16 includes a communication interface 32, processing circuitry 34, and memory 36. The communication interface 32 may be configured to communicate with the gateway 12 and/or the network node 14 and/or other elements in the system 10. In some embodiments, the communication interface 32 may be formed as or may include, for example, one or more radio frequency (RF) transmitters, one or more RF receivers, and/or one or more RF transceivers, and/or may be considered a radio interface. In some embodiments, the communication interface 32 may include a wired and/or a wireless interface.

The processing circuitry 34 may include one or more processors 37 and memory, such as, the memory 36. In particular, in addition to a traditional processor and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 37 and/or the processing circuitry 34 may be configured to access (e.g., write to and/or read from) the memory 36, which may comprise any kind of volatile and/or nonvolatile memory, e.g., cache and/or buffer memory and/ or RAM (Random Access Memory) and/or ROM (Read-Only Memory) and/or optical memory and/or EPROM (Erasable Programmable Read-Only Memory).

Thus, the UE 16 may further include software stored internally in, for example, memory 36, or stored in external memory (e.g., database) accessible by the UE 16 via an external connection. The software may be executable by the processing circuitry 34. The processing circuitry 34 may be configured to control any of the methods and/or processes described herein and/or to cause such methods, and/or processes to be performed, e.g., by the UE 16. The memory 36 is configured to store data, programmatic software code and/or other information described herein. In some embodiments, the software may include instructions that, when executed by the processor 37 and/or processing circuitry 34, causes the processor 37 and/or processing circuitry 34 to perform the processes described herein with respect to the UE 16.

For example, the processing circuitry 34 of the UE 16 may be configured to communicate a data location request for data to be stored on at least one remote storage device within a requested geographic location. The processing circuitry 34 may be further configured to, as a result of the data location request for the data to be stored on the at least one remote storage device within the requested geographic location, receive location information associated with at least one network node of a wireless communication network serving at least one cell area corresponding to the requested geographic location, the location information being used to verify that a location of the at least one remote storage device on which the data is stored is within the requested geographic location. In some embodiments, the processing circuitry 34 is configured to execute instructions to communicate with the at least one network node 14 of the wireless communication network serving the at least one cell area corresponding to the requested geographic location to verify that the at least one remote storage device being served by the at least one network node 14 possesses the data whose location is being verified. In some embodiments, the processing circuitry 34 is configured to communicate the data to be stored on the at least one remote storage device to at least one cloud storage server for storage of the data on the at least one remote storage device, the at least one cloud storage server in communication with the at least one network node 14 of the wireless communication network via a location assurance gateway 12. In some embodiments, the received location information includes an indication of at least one code, each of the at least one code being configured to be unique to the at least one cell area as compared to other cell areas of the wireless communication network. In some embodiments, the at least one code is a sequence of codes, the sequence of codes being broadcast by the at least one network node 14 of the wireless communication network serving the at least one cell area, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, the received location information includes a mobile subscriber identifier of a location assurance gateway 12, the location assurance gateway 12 being in communication with the at least one storage device and the at least one network node 14 for verifying a location of the at least one storage device using the mobile subscriber identifier.

Figure 2:
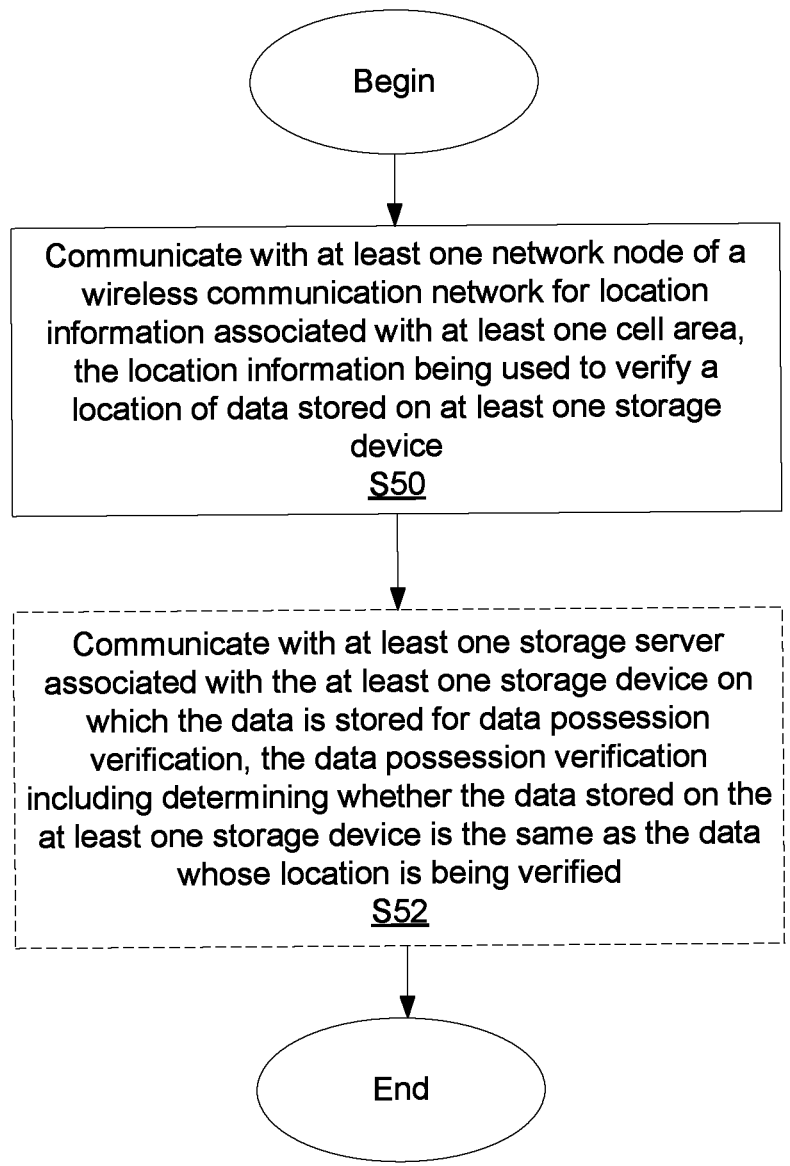
FIG. 2 is a flowchart of an exemplary method for a gateway according to one embodiment of the present disclosure.
Figure 5:
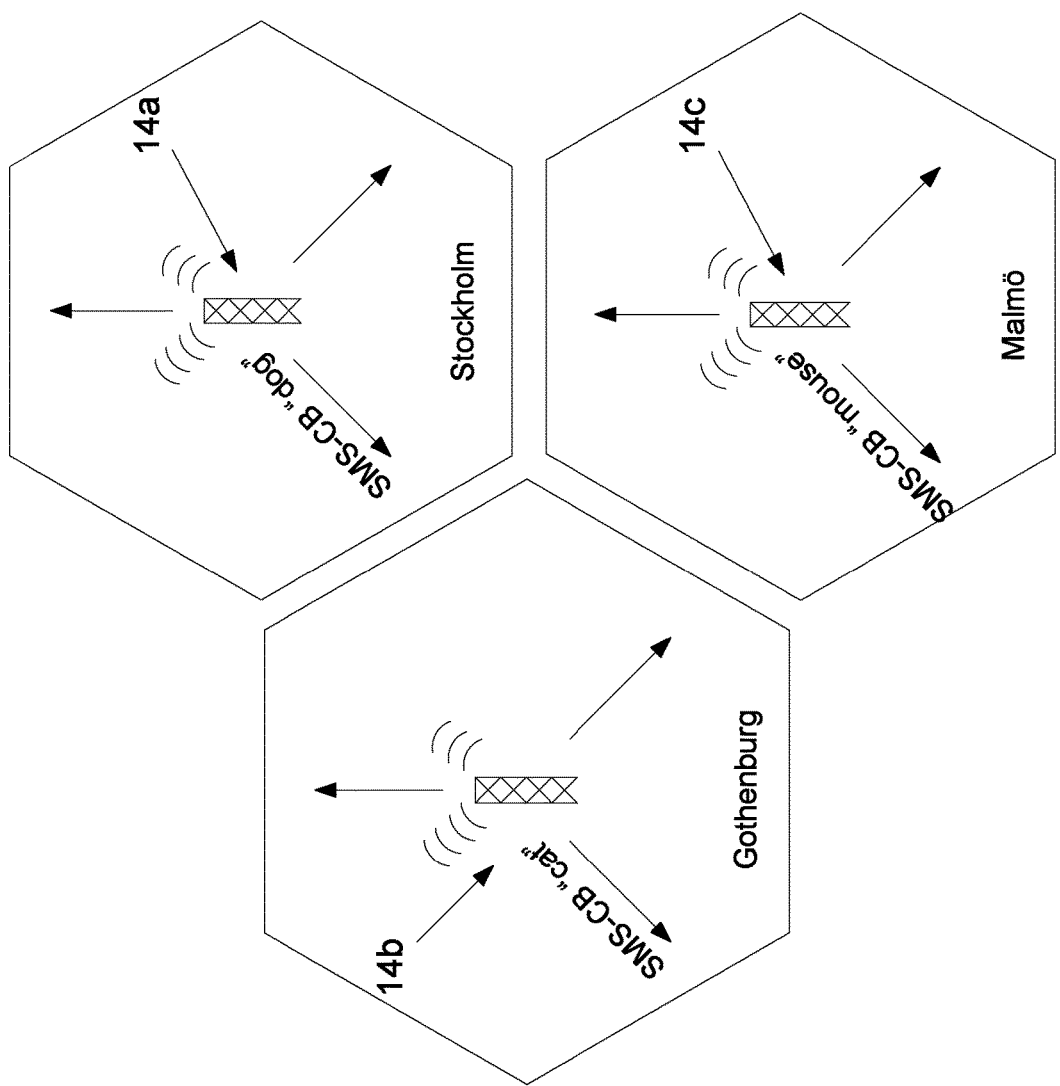
FIG. 5 is a schematic diagram illustrating a short-message service-cell broadcast (SMS-CB) of location specific codes according to one embodiment of the present disclosure.

FIG. 2 is a flowchart illustrating an exemplary method implemented in a gateway, such as, for example, the gateway 12 for verifying a location of data stored on at least one storage device within at least one cell area served by at least one network node 14 of a wireless communication network. The exemplary method includes communicating with the at least one network node 14 of the wireless communication network for location information associated with the at least one cell area, the location information being used to verify a location of the data stored on the at least one storage device (block S50). In some embodiments, the method may optionally include communicating with at least one storage server associated with the at least one storage device on which the data is stored for data possession verification, the data possession verification including determining whether the data stored on the at least one storage device is the same as the data whose location is being verified (block S52). In some embodiments, the verification of the location of the data stored on the at least one storage device includes using the communication of the gateway 12 with the at least one network node 14 of the wireless communication network to determine whether a physical location of the stored data is within a user-requested geographic area. In some embodiments, the verification of the location of the data stored on the at least one storage device includes using the communication of the gateway 12 with the at least one network node 14 of the wireless communication network to determine whether a physical location of the stored data is within a user-requested geographic area by comparing a geographic area associated with the at least one cell area to the user-requested geographic area. In some embodiments, the method may include receiving, from the at least one network node 14 of the wireless communication network, at least one code, each of the at least one code being configured to be unique to the one cell area as compared to other cell areas of the wireless communication network. In some embodiments, the at least one code is a sequence of codes, each of the sequence of codes being configured to be unique to the one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, the receiving the at least one code includes receiving each code of the at least one code from the at least one network node 14 as a short message service—cell broadcast (SMS-CB) message within the at least one cell area at a predetermined periodic interval. In some embodiments, the method may further include transmitting, to the at least one network node 14, at least one indication of a location of the gateway 12, the location of the gateway 12 being associated with a mobile subscriber identifier of a Subscriber Identity Module (SIM) associated with the gateway 12. In some embodiments, the method may further include communicating with a digital signature service provider using the mobile subscriber identifier as at least a portion of a digital signature for the data.

FIG. 3 is a flowchart illustrating an exemplary method implemented in a network node, such as, for example, the network node 14 of a wireless communication network configured to provide location assurance services for verifying a location of data stored on at least one storage device within at least one cell area served by the network node 14. The exemplary method includes communicating with at least one location assurance gateway 12 within the at least one cell area, over the wireless communication network, for location information, the location information being used to verify a location of the data stored on the at least one storage device (block S54). In some embodiments, communicating with at least one location assurance gateway 12 includes transmitting, to the at least one location assurance gateway 12, at least one code, the at least one code being the location information used to verify the location of the data and each of the at least one code being configured to be unique to the at least one cell area as compared to other cell areas of the wireless communication network. In some embodiments, the at least one code is a sequence of codes, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, each code of the at least one code is transmitted to the at least one location assurance gateway 12 as a short message service—cell broadcast (SMS-CB) message within the at least one cell area being served by the network node 14. In some embodiments, the method further includes receiving a user-requested location verification request of the data stored on the at least one storage device, the user-requested location verification request including at least one code; comparing the at least one code from the user-requested location verification request to at least one code stored in a database associated with the network node 14; and, in response to the user-requested location verification, communicating at least one indication of a location of the at least one location assurance gateway 12 corresponding to the at least one code from the user-requested location verification request. In some embodiments, communicating with at least one location assurance gateway 12 includes receiving, from the at least one location assurance gateway 12, at least one indication of a location of the location assurance gateway 12 associated with a mobile subscriber identifier. In some embodiments, the method may further include receiving a data possession verification request, the data possession verification request associated with a mobile subscriber identifier, the mobile subscriber identifier used to determine whether the at least one storage device associated with at least one location assurance gateway 12 having the mobile subscriber identifier possesses the data whose location is being verified. In some embodiments, the method may further include receiving a user-requested location verification request of the data stored on the at least one storage device, the user-requested location verification request including a mobile subscriber identifier; and, in response to the user-requested location verification, communicating at least one indication of a location associated with the mobile subscriber identifier.

FIG. 4 is a flowchart illustrating an exemplary method for location verification of data stored on at least one remote storage device. The method may be implemented in a UE, such as, for example, the UE 16. The method includes communicating a data location request for data to be stored on at least one remote storage device within a requested geographic location (block S56). The method further includes, as a result of communicating the data location request for the data to be stored on the at least one remote storage device within the requested geographic location, receiving location information associated with at least one network node 14 of a wireless communication network serving at least one cell area corresponding to the requested geographic location, the location information being used to verify that a location of the at least one remote storage device on which the data is stored is within the requested geographic location (block S58). In some embodiments, the method may further include communicating with the at least one network node 14 of the wireless communication network serving the at least one cell area corresponding to the requested geographic location to verify that the at least one remote storage device being served by the at least one network node possesses the data whose location is being verified. In some embodiments, the method may further include communicating the data to be stored on the at least one remote storage device to at least one cloud storage server for storage of the data on the at least one remote storage device, the at least one cloud storage server in communication with the at least one network node 14 of the wireless communication network via a location assurance gateway 12. In some embodiments, receiving the location information includes receiving an indication of at least one code, the at least one code being broadcast by the at least one network node 14 of the wireless communication network serving the at least one cell area, each of the at least one code being configured to be unique to the at least one cell area as compared to other cell areas of the wireless communication network. In some embodiments, the at least one code is a sequence of codes, the sequence of codes being broadcast by the at least one network node 14 of the wireless communication network serving the at least one cell area, each of the sequence of codes being configured to be unique to the at least one cell area as compared to other cell areas of the wireless communication network. In some embodiments, each of the at least one code is further configured to be unique to a time period, as compared to other time periods associated with a predetermined periodic interval at which each of the at least one code is communicated. In some embodiments, receiving the location information includes receiving a mobile subscriber identifier of a location assurance gateway 12, the location assurance gateway 12 being in communication with the at least one storage device and the at least one network node 14 for verifying a location of the at least one storage device using the mobile subscriber identifier.

Having described some embodiments of the present disclosure, a more detailed description of some of the embodiments will now be described below, with reference primarily to FIGS. 5-10.

Some embodiments of the present disclosure leverage an existing cell broadcast feature of many mobile networks, where text information can be sent to any mobile terminal (e.g., UE 16) in a specific geographic area. Such geographic area can be the size of a single cell in a mobile network, or a plurality of cells in the mobile network, or, in some embodiments, an entire mobile network. A mobile network operator may use this cell broadcast feature to broadcast unique secret codes (one code per location area) at regular intervals. In some embodiments, the codes may be unique code words that can be broadcast as e.g., text messages on a cell broadcast feature of the network node 14 covering one or more cell areas.

The cloud data center may be equipped to receive these broadcast messages and to keep a log of the received codes, which, when compared with the mobile network operator's (e.g., network node 14) master record can point to a specific location area. In embodiments, the correct sequence of codes and time stamps cannot be reproduced by any other facility outside the range of a particular cell tower (e.g., network node 14). An example of one embodiment is illustrated in the schematic diagram of FIG. 5, which shows three different network nodes 14a, 14b, and 14c, each covering different cell areas and each broadcasting three different code words (e.g., "cat," "dog", "mouse" as simplistic examples used for ease of understanding and illustration purpose only) in its respective cell area. A person skilled in the art would understand that code words used in a real setup would more likely be in the form of pre-defined or randomly generated alphanumeric strings of characters or in the form of binary or hexadecimal sequences of digits. In the example, the data center is located in the cell area covered by network node 14c (e.g., the city of Malmo), which broadcasts the code word "mouse." In some embodiments, this unique code word can be used to verify a location of data stored on at least one storage device within the cell area.

Figure 6:
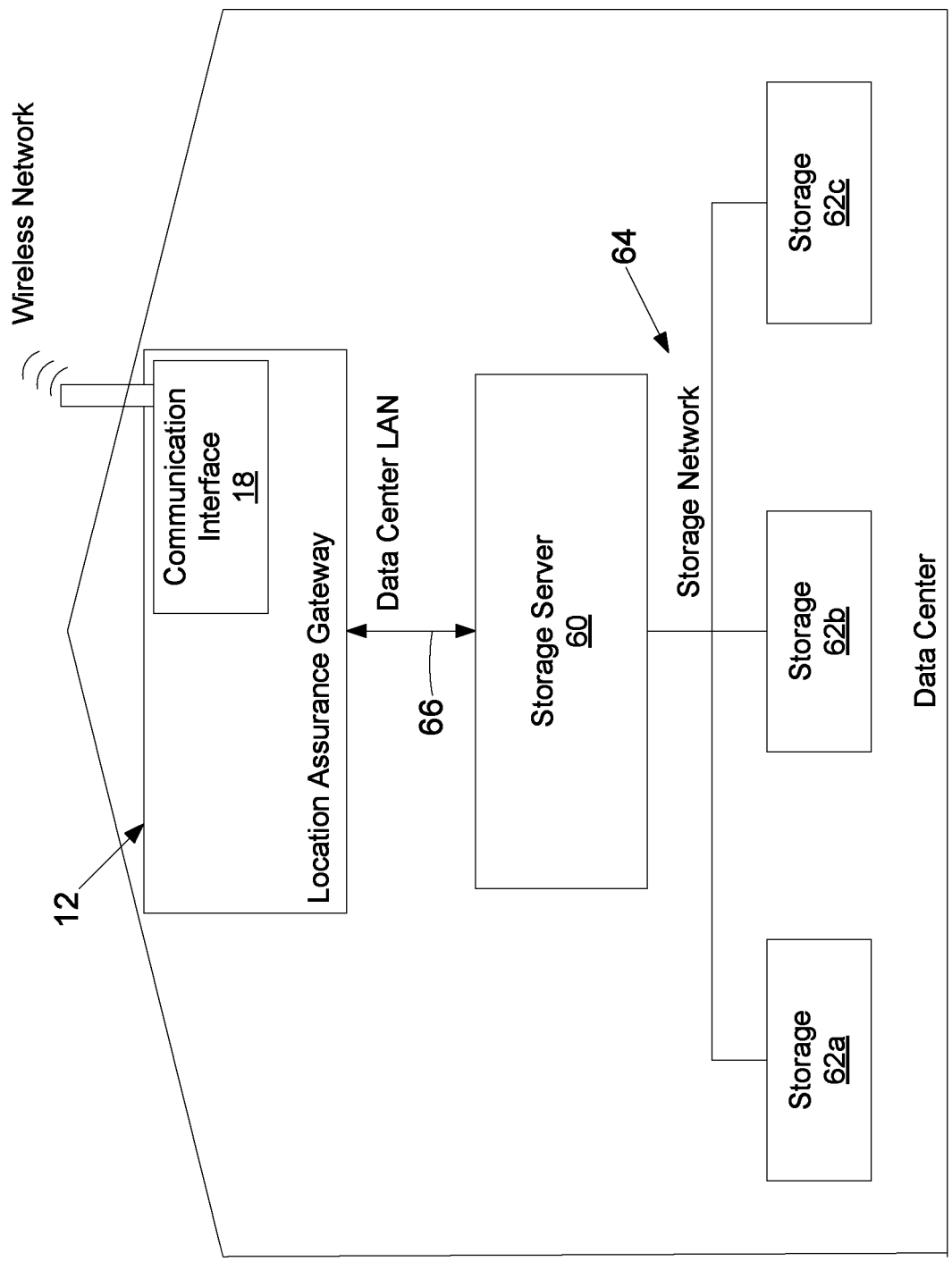
FIG. 6 is a schematic diagram of an exemplary location assurance gateway implemented at a data center according to one embodiment of the present disclosure.

FIG. 6 is a schematic diagram that illustrates an exemplary data center according to one embodiment of the present disclosure. The data center may be equipped with a gateway, such as, the location assurance gateway 12. In one embodiment, the gateway 12 is configured to receive and locally store the received location assurance information from the wireless network. The gateway 12 may have an integrated radio module (e.g., communication interface 18) that is configured to receive and process the SMS-CB transmissions for data location verification. The data center may further house at least one storage server 60 and at least one storage device 62. In some embodiments, the storage server 60 may manage a plurality of storage devices 62 (e.g., 62a, 62b, 62c). The storage server 60 can be considered any server that provides storage services for storing data on one or more storage devices 62. The storage device 62 can be any memory configured to store data and is preferably nonvolatile memory (e.g., read-only memory (ROM), Flash, solid state drive (SSD), optical drive, etc.). The storage device 62 can, in some embodiments, be memory internal to a device on which the server 60 runs, and may, in some embodiments, be memory external to the server 60 and that is managed by the server 60. It should be understood that although the storage device 62 shown in FIG. 6 appears to be external memory that is connected to the server 60 over a storage network 64, embodiments of the present disclosure are not necessarily limited to the exemplary implementation and may, in some embodiments, for example, provide for the storage device 62 to be internal memory on the server 60.

In some embodiments, the storage server 60 and the radio module (e.g., communication interface 18) may be housed in a sealed, tamper proof casing/enclosure, such that the server 60 and the radio module cannot be easily physically separated, to further ensure the integrity of the data verification. In some embodiments, other services residing in the data center, such as cloud storage services, may subscribe to the location assurance information and may receive notifications via, for example, the data center internal local area network (LAN) 66 when the location assurance codes are refreshed.

Figure 7:
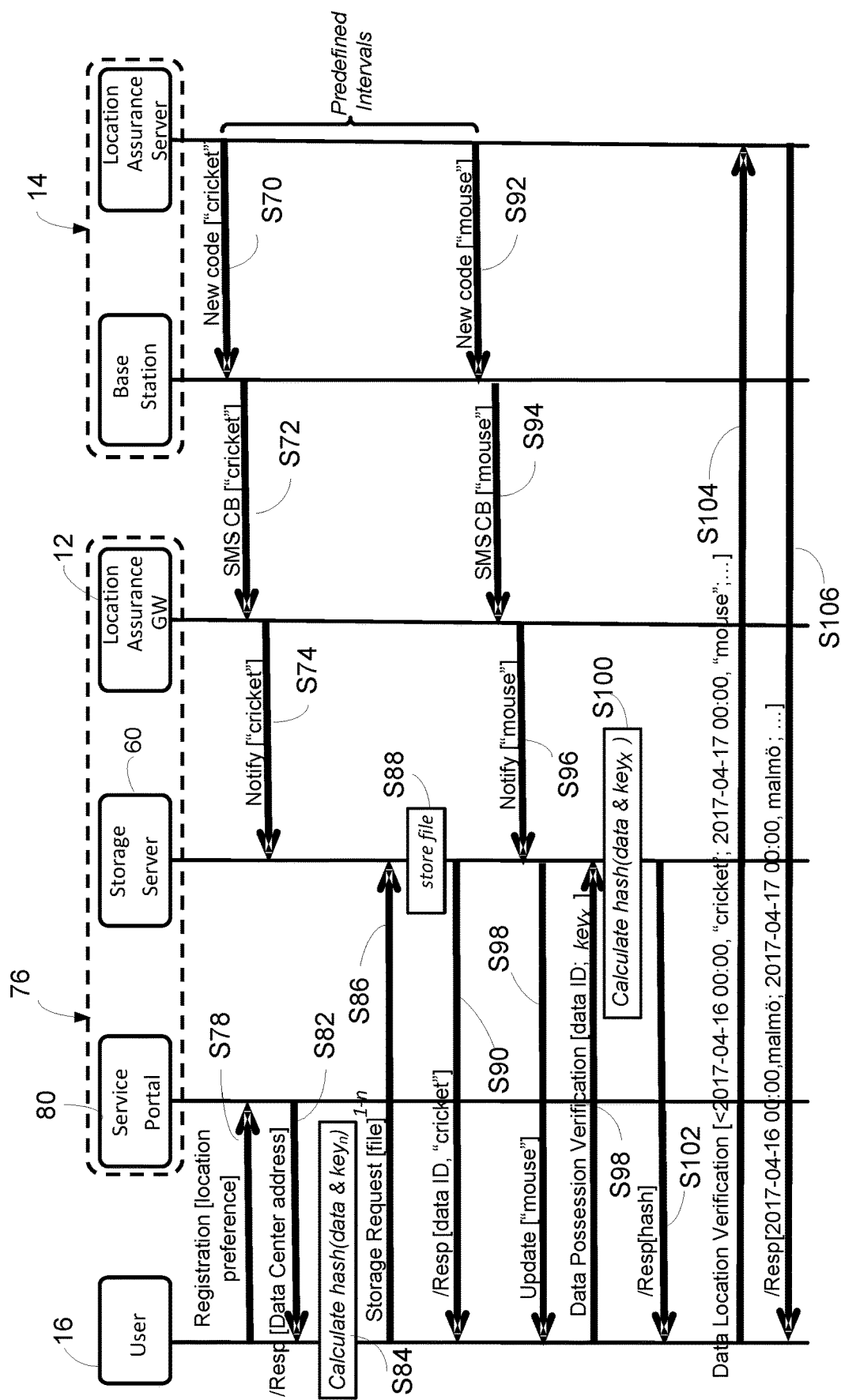
FIG. 7 is a flow diagram illustrating an exemplary data location assurance message flow according to one embodiment of the present disclosure.

One embodiment of the present disclosure will now be described with reference to the flow diagram depicted in FIG. 7. The exemplary process may begin with the network node 14 broadcasting a new code to the gateway 12 at the data center. The network node 14 is shown in FIG. 7 as including a radio network node such as for example a base station (e.g., eNodeB) and a location assurance server. Although the base station and location assurance server are shown as separate elements in FIG. 7, in some embodiments, the location assurance server may be included as part of the base station. In other embodiments, the location assurance server may be an intermediate node capable of communicating unique code words to one or more base stations.

In one embodiment, the location assurance server associated with the network node 14 may generate a unique code (one per location area) (block S70). The base station cell towers associated with the network node 14 may broadcast the codes using, for example, SMS-CB messages (block S72). The broadcast codes are received (via the communication interface 18) by the gateway 12 that is located within the cell area covered by the network node 14 and communicated to the storage server 60 (block S74). Other network nodes covering other cell areas (e.g., 14a and 14b, etc.) may broadcast different codes. The code words depicted in FIG. 7 are meaningful words for ease of readability; however, in practice, the generated codes may not correspond to language words and may be, for example, a predefined or randomly generated text string, an alphanumeric string, or a binary or hexadecimal sequence of digits of a predefined length. The location assurance server may keep a master record of the transmitted codes and, for each transmitted code, a corresponding location and time stamp, as shown, for example, in Table 1 below.

TABLE 1

Location assurance master record.

| Sent: | Location Area Gothenburg | Location Area Stockholm | Location Area Malmo |
|---|---|---|---|
| 2017 Apr. 16 00:00 | "ant" | "bee" | "cricket" |
| 2017 Apr. 17 00:00 | "cat" | "dog" | "mouse" |

In one embodiment, a user (via e.g., the UE 16) signs-up or registers with a storage service provider 76 and indicates the applicable location restraints or user-requested geographic location for the data concerned (block S78). The user-requested geographic location may be, for example, data location restrictions to a particular country, state, city, or other location. User registration and/or communication of a location preference/restriction may be through, for example, a web-based service portal 80 for location assurance and/or data possession verification services, according to one or more of the techniques described in the present disclosure. In one embodiment, in response to the user's request, the cloud storage service provider 76 may determine at least one data center within the user-requested geographic location. The service provider 76 may communicate to the UE 16 of the user a network address of a suitable data center within the requested geographical area (block S82).

For the sake of brevity, the term service provider 76 is used, although it should be apparent to those of skill in the art that communications, determinations, and other processes of the service provider 76 may be performed by a computing device associated with the service provider 76. Also, it should be understood that in preferred embodiments all communication between the user client and the service provider 76 in this and other flow diagrams may take place through secure connections.

The user may prepare data for storage by performing a data possession algorithm on the data (block S84). For example, the UE 16 associated with the user may pre-calculate and store the outcome of a hash value of the data file concatenated with an n number of secret random keys before submitting it to the service provider 76 for storage. Hashes are one example of a proof of data possession mechanism. In other embodiments, more elaborate protocols can be applied to the data for data possession verification. The data can be an individual data file, or may be a container file with all or at least a portion of the enterprise's data to be stored by the service provider 76 collectively. The UE 16 may send a storage request along with the data to the storage server 60 (block S86). The storage server 60 may store the data (block S88). The storage server 60 may send to the UE 16 a currently valid location assurance code (e.g., "cricket") along with, for example, a data identifier (ID) and/or a time stamp (block S90).

In one embodiment, at predetermined intervals (e.g., hourly, daily, monthly, etc.), the location assurance server associated with the network node 14 may refresh the code for each location area (block S92) and issue new cell broadcasts (block S94). The broadcasts may be received by the respective gateway 12 and forwarded to, for example, the storage server 60 (block S96), which can pass on the received codes to the user client UE 16 (block S98).

The UE 16 may subsequently challenge the storage server 60 to prove that the server 60 possesses the data by sending one of the secret keys to the storage server 60 (block S98). The storage server 60 may calculate the hash on the data using the key (block S100) and return, to the UE 16, the hash result (block S102). If the UE 16 determines that the correct harsh result was returned by the storage server 60, the UE 16 may determine that the storage server 60 does indeed possess the data. Accordingly, the UE 16 may proceed with data location verification, having confirmed data possession. In some embodiments, the UE 16 may store a local record of the location assurance codes as received from the service provider 76. The record may in some embodiments correspond to a table, such as, for example, Table 2 shown below.

TABLE 2

Location assurance local record.

| Received: | Code Word |
|---|---|
| 2017 Apr. 16 00:00 | "cricket" |
| 2017 Apr. 17 00:00 | "mouse" |

In one embodiment, data location verification may include the UE 16 requesting data location verification by submitting a sequence of received codes with time stamps to the node (e.g., network node 14) responsible for location assurance services (block S104). The location assurance server associated with the network node 14 may compare the submitted code word sequence with its own master record. Based on such comparison, the network node 14 may return a corresponding location for each of the submitted codes (e.g., cell tower location) (block S106). Accordingly, a chronological location trace of the data file can be established. In some embodiments, the request/query for data location verification can request data location verification for the complete lifetime of the data file while in storage. In other embodiments, the request/query for data location verification may be a request for a more limited time interval, such as, during a time period in which a security incident is suspected.

In a second embodiment, the local copy of the location information (e.g., location assurance codes) can be stored at the gateway 12, instead of the UE 16. In some cases, it may be more desirable to secure the location information (e.g., location assurance log) internally at the service provider 76, rather than the user's UE 16. In some embodiments, if it can be assumed that the data storage location is static (meaning that the data file may be moved between servers 60 within the data center but will not be moved to another data center location), it may be sufficient to provide a hash value of the recorded sequence of codes for a requested data range, rather than the complete sequence of codes. In some such embodiments, the location assurance server may calculate code sequence hash values for the same data range for all locations in the master record and merely return the name of the location that has a matching hash value result, as shown, in the exemplary method depicted in FIG. 8. Advantageously, the sequence of location assurance codes may not be exposed outside of the data center infrastructure.

Figure 8:
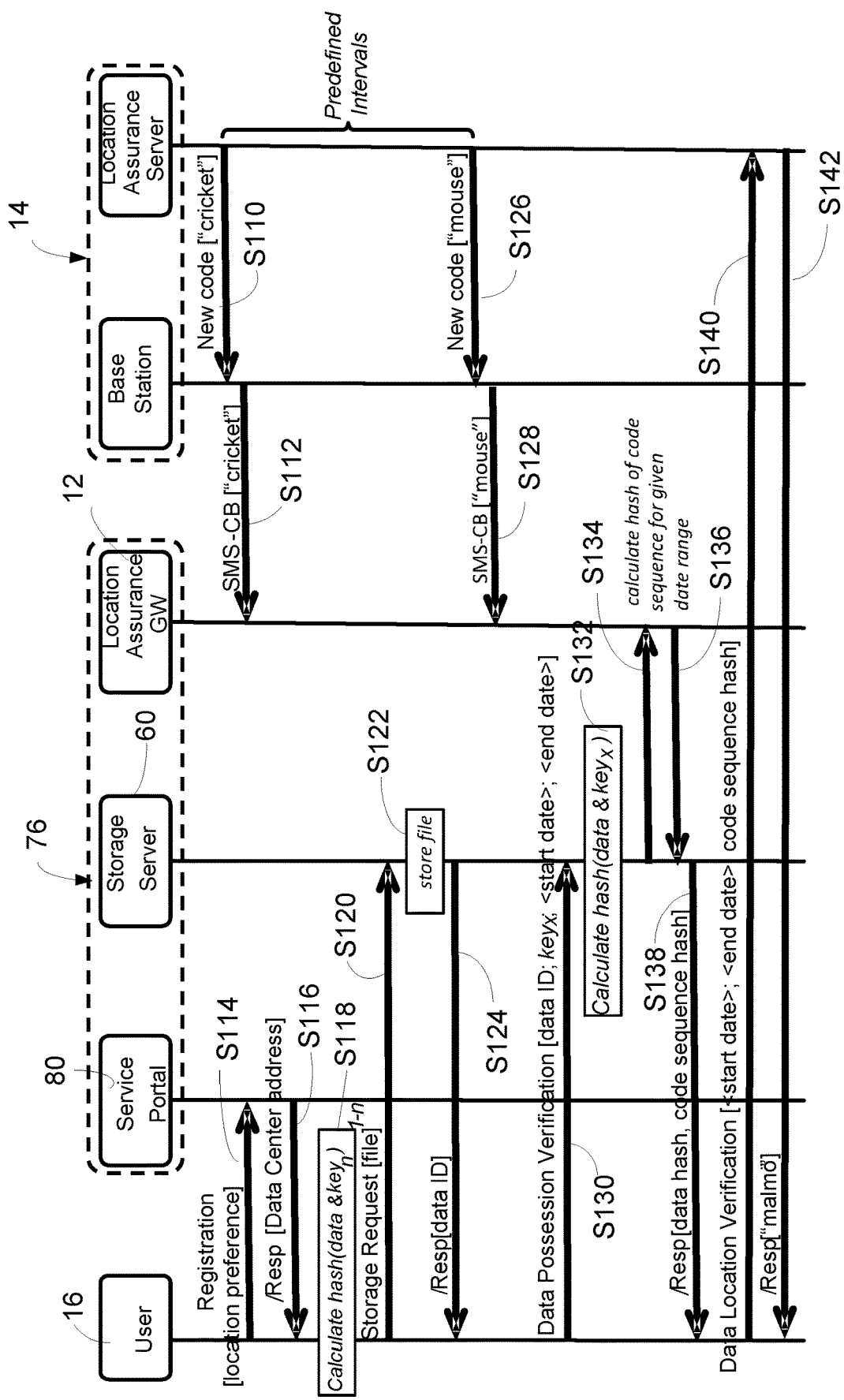
FIG. 8 is flow diagram illustrating yet another exemplary data location assurance message flow according to an alternative embodiment of the present disclosure.

Referring now to the exemplary alternative method shown in FIG. 8, the location assurance server associated with the network node 14 may generate a unique code (one per location area) (block S110). The base station cell towers associated with the network node 14 may broadcast the codes using, for example, SMS-CB messages (block S112). The broadcast codes may be received (via the communication interface 18) by the gateway 12 that is located within the cell area covered by the network node 14. The gateway 12 may store the received sequence of code words in, for example, local memory, or in other memory (e.g., database) at the service provider 76. Other network nodes covering other cell areas (e.g., 14a and 14b, etc.) may broadcast different codes. The location assurance server may keep a master record of the transmitted codes and, for each transmitted code, a corresponding location and time stamp, as shown, for example, in Table 1 above.

In one embodiment, a user (via e.g., the UE 16) signs-up or registers with a storage service provider 76 and indicates the applicable location restraints or user-requested geographic location for the data concerned (block S114). The user-requested geographic location may be, for example, data location restrictions to a particular country, state, city, or other location. User registration and/or communication of a location preference/restriction may be through, for example, a web-based service portal 80 for location assurance and/or data possession verification services, according to one or more of the techniques described in the present disclosure. In one embodiment, in response to the user's request, the cloud storage service provider 76 may determine at least one data center within the user-requested geographic location. The service provider 76 may communicate to the UE 16 a data center address of a suitable data center within the requested geographical area (block S116).

The user may prepare data for storage by performing a data possession algorithm on the data (block S118). For example, the UE 16 associated with the user may pre-calculate and store the outcome of a hash value of the data file concatenated with an n number of secret random keys before submitting it to the service provider 76 for storage. Hashes are one example of a proof of data possession mechanism. In other embodiments, more elaborate protocols can be applied to the data for data possession verification. The data can be an individual data file, or may be a container file with all or at least a portion of the enterprise's data to be stored by the service provider 76 collectively. The UE 16 may send a storage request along with the data to the storage server 60 (block S120). The storage server 60 may store the data (block S122). The storage server 60 may send to the UE 16 a data identifier (ID) and/or a time stamp associated with the stored data (block S124).

In one embodiment, at predetermined intervals (e.g., hourly, daily, monthly, etc.), the location assurance server associated with the network node 14 may refresh the code for each location area (block S126) and issue new cell broadcasts (block S128). The broadcasts may be received by the respective gateway 12 and stored locally by the gateway 12.

The UE 16 may subsequently challenge the storage server 60 to prove that the server 60 possesses the data by sending one of the secret keys to the storage server 60, along with, for example a data range and the data ID identifying the data file to be verified (block S130). The storage server 60 may calculate the hash on the identified data and using the key (block S132). In one embodiment, storage server 60 may request that the gateway 12 calculate, for example, a hash of the code sequence for the user-requested date range (block S134). The gateway 12 may perform a hash on the code sequence for the date range and may return to the storage server 60 the hash result (block S136). In other embodiments, other types of verification algorithms may be used in addition to and/or instead of a hash algorithm, which is one non-limiting example. The storage server 60 may, in response to the UE 16's request for verification, send to the requesting UE 16 the data hash result and the code sequence hash result (block S138). The data hash result may provide the UE 16 with data possession verification and the code sequence hash result may be used by the UE 16 for data location verification. For example, the UE 16 may send a data location verification request that includes the requested date range applicable to the code sequence hash result (block S140). The data location verification request may be received by the location assurance server associated with the network node 14 serving the cell area of the storage server 60. The location assurance server may calculate the hash on the code sequence for the requested date range and return an indication of a location having a matching hash value result (block S142). The indication may be, for example, a name of a city, a cell ID, or any other indication of location. Thus, some embodiments of the present disclosure are able to leverage the pervasiveness of cellular coverage in order to tie the vicinity of a cloud data center to one or more network nodes 14, thereby pinning the data center site to the cellular grid for data location verification.

Figure 9:
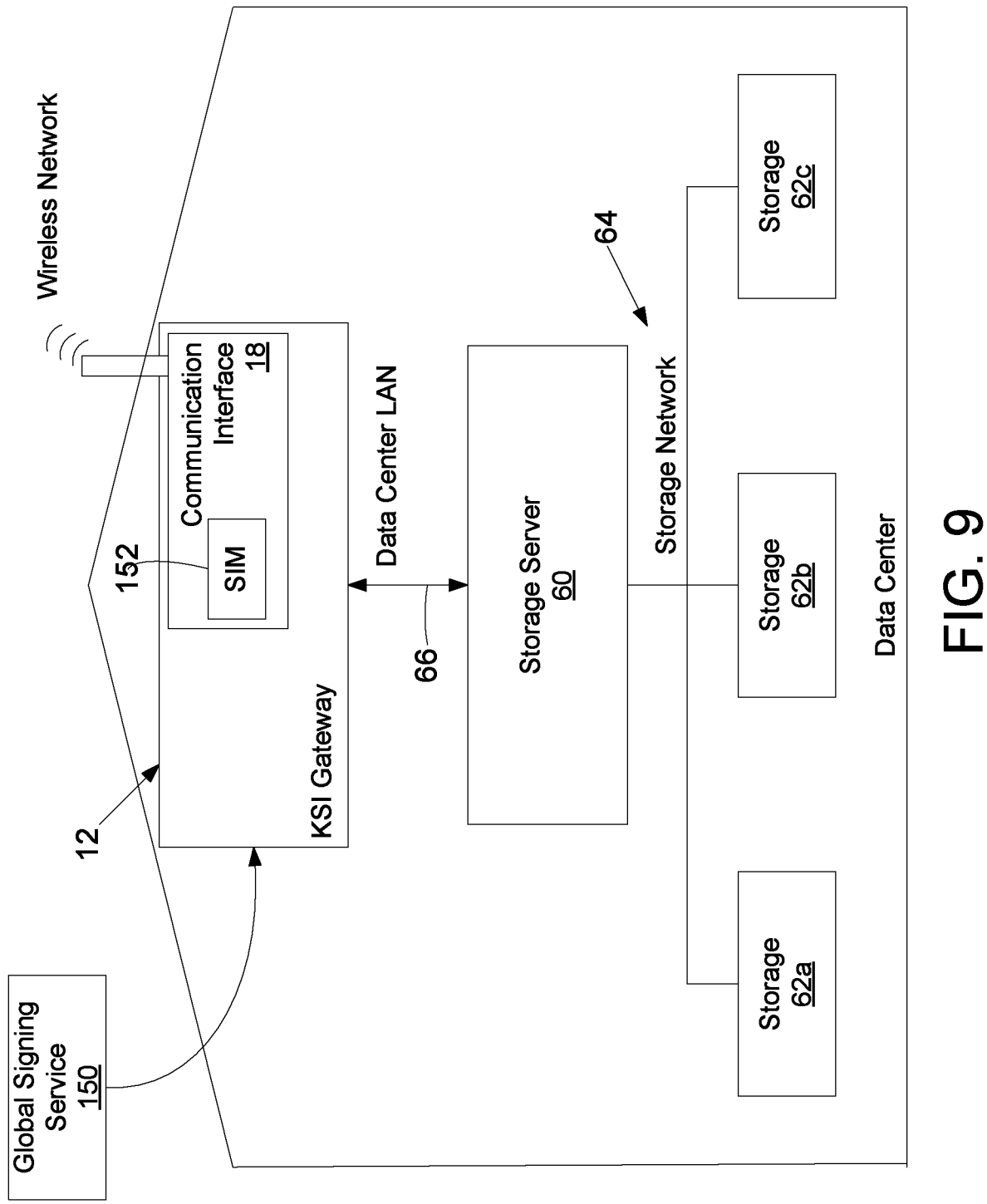
FIG. 9 is a schematic diagram illustrating an exemplary location-aware KSI gateway implemented within a data center according to one embodiment of the present disclosure.

FIG. 9 is a schematic diagram that illustrates an exemplary data center according to a third embodiment of the present disclosure. In one embodiment, a gateway 12 may be formed as a digital signature gateway 12 that can be used to equip the data center with location-aware digital signature signing services. In one embodiment, the gateway 12 may be formed as a location-aware KSI gateway 12 configured to interact with a digital signature service provider 150, such as, for example, a global signing service 150 to receive secure data signatures. The gateway 12 may include an integrated radio module (e.g., communication interface 18) with an embedded SIM card 152. The SIM card 152 may be configured to interact with a wireless network, such as, a cellular network. In one embodiment, the gateway 12, together with the integrated radio module may be housed in a sealed, tamper proof casing/enclosure such that the gateway 12 and the radio module 18 cannot be physically separated.

As with the data center depicted in FIG. 6, the data center in FIG. 9 may further house at least one storage server 60 and at least one storage device 62. The storage server 60 can be considered any server that provides storage services for storing data on a storage device 62. The storage device 62 can, in some embodiments, be memory internal to a device on which the server 60 runs, and may, in some embodiments, be memory external to the server 60 but that is managed by the server 60. In some embodiments, other services residing in the data center, such as cloud storage services, may subscribe to the location-aware digital signing service over the data center internal LAN 66.

Figure 10:
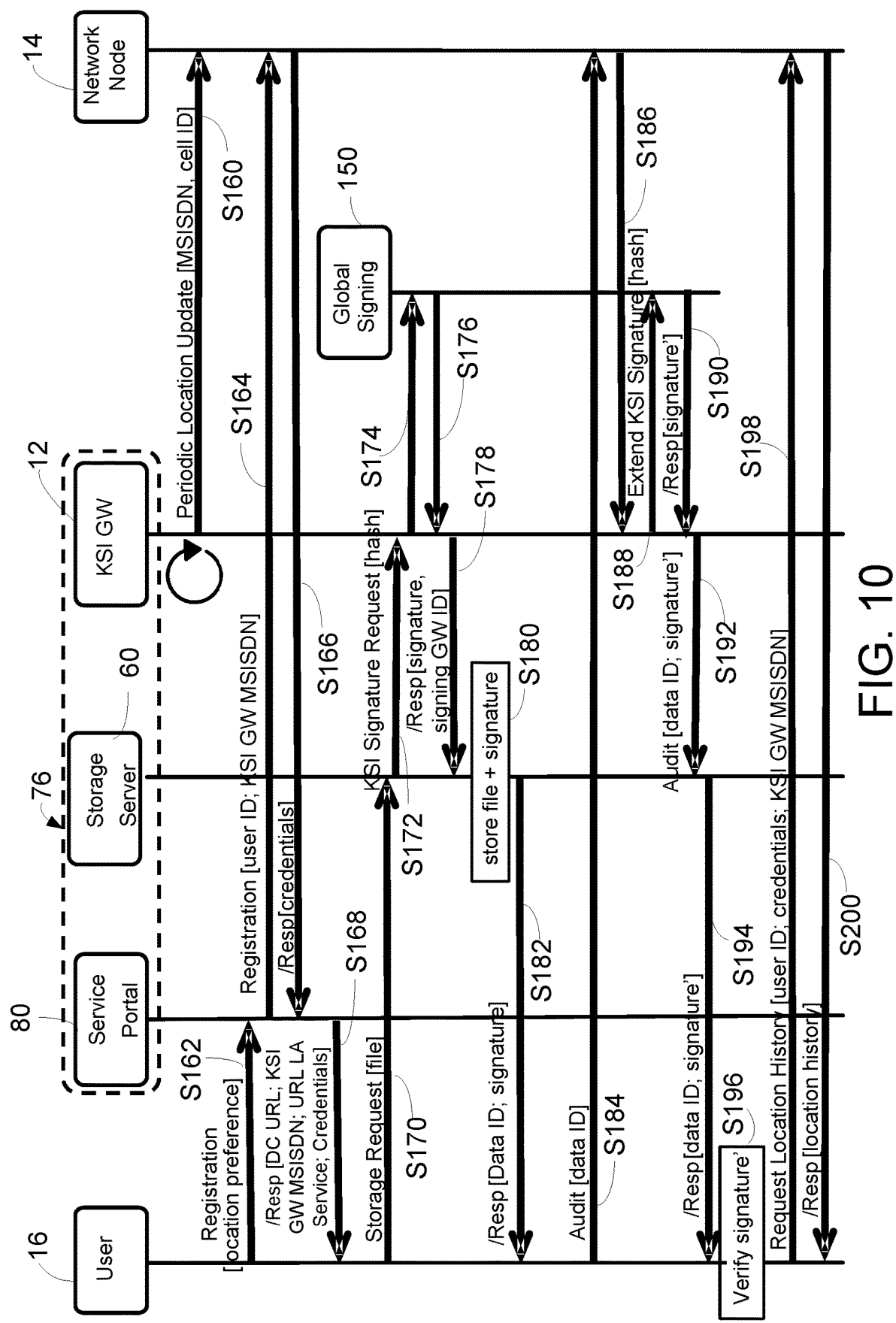
FIG. 10 is a flow diagram illustrating an exemplary location-aware digital signal signing message flow according to one embodiment of the present disclosure.

An example of this third embodiment of the present disclosure will now be described with reference to the flow diagram depicted in FIG. 10. The exemplary process may begin with the gateway 12 (via, for example, the communication interface 18) transmitting periodic location updates to the network node 14 of the wireless network (block S160). In some embodiments, the periodic location updates may include a mobile subscriber identifier (e.g., Mobile Station International Subscriber Directory Number (MSISDN)) and/or a cell ID of the network node 14. Depending on the type of wireless network, the location information from the gateway 12 may be stored in the Home Location Register (HLR) and/or Home Subscriber Server (HSS) nodes, from where the location information can be logged and maintained for future reference/use. In some embodiments, the periodic location updates may be repeated at predefined/predetermined intervals as may be set a provider associated with the network node 14, such as, for example, a cellular service provider.

In one embodiment, a user (via e.g., the UE 16 of an enterprise user) signs-up or registers with a storage service provider 76 and indicates the applicable location restraints or user-requested geographic location for the data concerned (block S162). The user-requested geographic location may be, for example, data location restrictions to a particular country, state, city, or other location. User registration and/or communication of a location preference/restriction may be through, for example, a web-based service portal 80 for location assurance and/or data possession verification services, according to one or more of the techniques described in the present disclosure. The storage service provider 76 may determine a suitably located data center, based on the user's location request. The storage service provider 76 may communicate with the wireless network (e.g., network node 14) to register the user by, for example, associating the user with the particular data center (block S164), or, more specifically, in some embodiments, to associate a user ID and a mobile subscriber identifier (e.g., MSISDN) of the gateway 12 at the suitably located data center. In one embodiment, the network node 14 (or another node associated with the wireless network) may respond to the registration request by, for example, sending a set of login credentials for the user to login and use the location assurance (LA) service associated with the network node 14 (block S166). In one embodiment, the storage service provider 76 may send to the UE 16 a registration response message, which may include information for the user to use the LA service and/or the digital signature services (block S168). For example, the message may include the Uniform Resource Locator (URL) of the data center within the user-requested geographic area, the mobile subscriber identifier of the gateway 12 at the data center, a URL (e.g., link) of the LA service, and/or the login credentials for logging into a portal associated with the LA service.

In one embodiment, the user may send the data file to the storage server 60 for secure storage (block S170). When a data file is submitted for storage, the storage service provider 76 may have the data signed through the digital signature gateway 12 (block S172). The gateway 12 may compose a KSI signature request for the global signing service 150 (block S174). The global signing service 150 may send a KSI signature (block S176) according to known KSI methods. The gateway 12 may send the received KSI signature to the storage server 60, along with a gateway identifier (block S178). As a result of receiving the KSI signature from the gateway 12, the storage server 60 may store the data together with the corresponding SKI signature (block S180). In one embodiment, the KSI signature is sent to the client UE 16, along with a data ID that identifies the signed data (block S182). In some embodiments, part of the KSI signature is the identification of the aggregation layers through the KSI hash chain used to obtain the signature and may include the gateway identifier of the gateway 12 at the data center, as the lowest level. The gateway identifier may include the mobile subscriber identifier (e.g., MSISDN) that belongs to the gateway's embedded SIM card 152, which may be used to confirm the MSISDN value received at registration in for example block S168. In other words, the mobile subscriber identifier of the gateway 12 may, in some embodiments, form part of the KSI signature for the stored data.

In one embodiment, when the user wants to perform an audit on the data (to verify data possession and/or data location), the UE 16 may send a request message (block S184). In one embodiment, the request message may be communicated through the wireless network to the network node 14, using the mobile subscriber identifier (e.g., the MSISDN provided to the UE 16 in S168) as the called address to verify that the provided mobile subscriber identifier value is valid and does belong to the entity (e.g., storage server 60) with access to the data file to be verified. In response to the request message, the network node 14 may send a message to the gateway 12 whose mobile subscriber identifier matches the received mobile subscriber identifier in the request message (block S186). In one embodiment, the gateway 12 may extend the KSI signature to allow the user to check the signature against a publication code for validating data integrity of the stored data (block S188). The global signing service 150 may respond with the signature (block S190) and the gateway 12 may send the signature and the data ID to the storage server 60 (block S192). The storage server 60 may send an audit response message to the UE 16 of the user (block S194). The audit response message may include the signature and the data ID for the data to be verified. The UE 16 may then verify the received signature (block S196).

Based on the verification, when the user is satisfied that the data is in possession of the data center/storage service provider 76 identified by the mobile subscriber identity (e.g., MSISDN of the gateway 12) and that the data has not been compromised, the UE 16 may proceed with attempting to verify the data's location (block S198). In one embodiment, the UE 16 user client can request a location trace for the mobile subscriber identifier of the storage service provider 76. In a further embodiment, the request may be communicated to the network node 14 serving the cell area within which the storage service provider 76 is located. In some embodiments, the request may be considered a request for location history of the data and may include, for example, the user ID, the login credentials, and/or the mobile subscriber identifier. In one embodiment, the location history request may be sent by the UE 16, for example, accessing the link for the LA service previously provided to the UE 16 at registration (S168). In one embodiment, network node 14 of the wireless network may verify that the provided mobile subscriber identifier is subscribed to the LA service and that the requesting user (identified by the user ID) is authorized to monitor the location of the device (e.g., gateway 12) associated with the mobile subscriber identifier. If the user and the mobile subscriber identifier are verified, the requested location history may be provided to the UE 16 of the user (block S200). Thus, embodiments of the present disclosure may provide the user with an independently verified digital trail for data stored at a remote data center/storage service provider 76. In addition, embodiments of the present disclosure provide for a location-aware digital signature gateway 12 that is configured to utilize a cellular service provider as a trusted and independent, third-party provider of verified location information with regards to data stored at, for example, a cloud infrastructure.

Abbreviations that may be used in the preceding description include:

| Abbreviations | Explanation |
| --- | --- |
| /Ack | Acknowledgement message |
| /Resp | Response message |
| CB | Cell Broadcast |
| CSP | Cloud Service Provider |
| DC | Data Center |
| GDPR | General Data Protection Regulation |
| GW | Gateway |
| HLR | Home Location Register |
| HSS | Home Subscriber Service |
| ID | Identity |
| KSI | Keyless Signatures Infrastructure |
| LAN | Local Area Network |
| MNO | Mobile Network Operator |
| PDP | Proof of Data Possession |
| RBS | Radio Base Station |
| RM | Radio Module |
| SIM | Security Identity Module |
| SLA | Service Level Agreement |
| SMS | Short Message Service |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A location assurance gateway located in a data center for verifying a location of data stored on at least one storage device within at least one cell area served by at least one network node of a wireless communication network, the location assurance gateway comprising:
a communication interface; and
processing circuitry, the processing circuitry configured to cause the communication interface to communicate with the at least one network node of the wireless communication network for location information associated with the at least one cell area, the location information associated with the at least one cell area being used to verify a location of the data stored on the at least one storage device, the verification of the location of the data stored on the at least one storage device including using the communication of the gateway with the at least one network node of the wireless communication network to determine whether a physical location of the stored data is within a user-requested geographic area, and the communication of the communication interface with the at least one network node of the wireless communication network including receiving, from the at least one network node, at least one code, the location being verified when the at least one code from the user-requested location verification request matches at least one code stored in a database associated with the network node, the at least one code being the location information used to verify the location of the data, each of the at least one code being configured to be unique to the one cell area as compared to other cell areas of the wireless communication network, the at least one code being a sequence of codes, each of the sequence of codes being configured to be unique to the one cell area as compared to other cell areas of the wireless communication network, each of the codes in the sequence of codes being configured to be unique to a time period, as compared to other time periods associated with a predetermined periodic interval at which each of the codes in the sequence of codes is communicated, the verification being performed by comparing at least one code from a user-requested location verification request to the at least one code stored in the database associated with the network node, and each of the at least one code broadcast by the at least one network node as a short message service-cell broadcast, SMS-CB, message within the at least one cell area at a predetermined periodic interval.

2. The gateway according to claim 1, wherein the verification of the location of the data stored on the at least one storage device includes using the communication of the gateway with the at least one network node of the wireless communication network to determine whether a physical location of the stored data is within a user-requested geographic area by comparing a geographic area associated with the at least one cell area to the user-requested geographic area.

3. The gateway according to claim 1, further comprising a server interface, the processing circuitry configured to cause the server interface to communicate with at least one storage server associated with the at least one storage device on which the data is stored for data possession verification, the data possession verification including determining whether the data stored on the at least one storage device is the same as the data whose location is being verified.

4. The gateway according to claim 1, wherein:
the gateway includes a Subscriber Identity Module associated with a mobile subscriber identifier; and
the communication of the communication interface with the at least one network node of the wireless communication network includes transmitting, to the at least one network node, at least one indication of a location of the gateway, the location of the gateway associated with the mobile subscriber identifier.

5. The gateway according to claim 4, wherein the gateway is further configured to communicate with a digital signature service provider using the mobile subscriber identifier as at least a portion of a digital signature for the stored data.

6. A network node for a wireless communication network, the network node configured to provide location assurance services for verifying a location of data stored on at least one storage device within at least one cell area served by the network node, the network node comprising:
a communication interface; and
processing circuitry, the processing circuitry configured to:
cause the communication interface to communicate with at least one location assurance gateway located in a data center within the at least one cell area for location information, the location information being used to verify a location of the data stored on the at least one storage device, the communication of the network node with the at least one location assurance gateway including transmitting, to the at least one location assurance gateway, at least one code, the at least one code being the location information used to verify the location of the data and each of the at least one code being configured to be unique to the at least one cell area as compared to other cell areas of the wireless communication network, the at least one code being a sequence of codes, each of the sequence of codes being configured to be unique to the one cell area as compared to other cell areas of the wireless communication network, each of the codes in the sequence of codes being configured to be unique to a time period, as compared to other time periods associated with a predetermined periodic interval at which each of the codes in the sequence of codes is communicated, and storing the at least one code in a database associated with the network node;
receive a user-requested location verification request of the data stored on the at least one storage device, the user-requested location verification request including at least one code, the verification being performed by comparing at least one code from a user-requested location verification request to the at least one code stored in a database associated with the network node, the location being verified when the at least one code from the user-requested location verification request matches the at least one code stored in the database associated with the network node;
compare the at least one code from the user-requested location verification request to at least one code stored in the database associated with the network node;
in response to the user-requested location verification, communicate at least one indication of a location of the at least one location assurance gateway corresponding to the at least one code from the user-requested location verification request; and
broadcast each of the at least one code by the at least one network node as a short message service-cell broadcast, SMS-CB, message within the at least one cell area at a predetermined periodic interval.

7. The network node according to claim 6, wherein the communication of the network node with the at least one location assurance gateway includes receiving, from the at least one location assurance gateway, at least one indication of a location of the location assurance gateway associated with a mobile subscriber identifier.

8. The network node according to claim 6, wherein the processing circuitry is further configured to receive a data possession verification request, the data possession verification request associated with a mobile subscriber identifier, the mobile subscriber identifier used to determine whether the at least one storage device associated with at least one location assurance gateway having the mobile subscriber identifier possesses the data whose location is being verified.

9. The network node according to claim 6, wherein the processing circuitry is further configured to:
receive a user-requested location verification request of the data stored on the at least one storage device, the user-requested location verification request including a mobile subscriber identifier; and
in response to the user-requested location verification, communicate at least one indication of a location associated with the mobile subscriber identifier.

10. A user equipment, UE, comprising processing circuitry, the processing circuitry configured to:
communicate a data location request for data to be stored on at least one remote storage device within a requested geographic location;
as a result of the data location request for the data to be stored on the at least one remote storage device within the requested geographic location, receive location information associated with at least one network node of a wireless communication network serving at least one cell area corresponding to the requested geographic location, the location information being used to verify that a location of the at least one remote storage device on which the data is stored is within the requested geographic location, the received location information including an indication of at least one code, the at least one code being the location information used to verify the location of the data, the location being verified when the at least one code from the user-requested location verification request matches the at least one code stored in a database associated with the network node, each of the at least one code being configured to be unique to the at least one cell area as compared to other cell areas of the wireless communication network, the at least one code being a sequence of codes, each of the sequence of codes being configured to be unique to the one cell area as compared to other cell areas of the wireless communication network, each of the codes in the sequence of codes being configured to be unique to a time period, as compared to other time periods associated with a predetermined periodic interval at which each of the codes in the sequence of codes is communicated; and
communicate with the at least one network node of the wireless communication network serving the at least one cell area corresponding to the requested geographic location to verify that the at least one remote storage device being served by the at least one network node possesses the data whose location is being verified, the verification being performed by comparing the indicated at least one code to at least one code stored in the database associated with the network node; and
broadcast each of the at least one code by the at least one network node as a short message service-cell broadcast, SMS-CB, message within the at least one cell area at a predetermined periodic interval.

11. The UE according to claim 10, wherein the processing circuitry is configured to communicate the data to be stored on the at least one remote storage device to at least one cloud storage server for storage of the data on the at least one remote storage device, the at least one cloud storage server in communication with the at least one network node of the wireless communication network via a location assurance gateway.

12. The UE according to claim 10, wherein the received location information includes a mobile subscriber identifier of a location assurance gateway, the location assurance gateway being in communication with the at least one storage device and the at least one network node for verifying a location of the at least one storage device using the mobile subscriber identifier.

* * * * *